US006387532B1

United States Patent
Atarashi et al.

(10) Patent No.: US 6,387,532 B1
(45) Date of Patent: May 14, 2002

(54) COATED POWDER AND PROCESS FOR THE PREPARATION THEREOF

(75) Inventors: Takafumi Atarashi; Akira Kishimoto, both of Tokyo; Katsuto Nakatsuka, Miyagi, all of (JP)

(73) Assignees: Nittetsu Mining Co., Ltd., Tokyo; Katsuto Nakatsuka, Miyagi, both of (JP)

( * ) Notice: Subject to any disclaimer, the term of this patent is extended or adjusted under 35 U.S.C. 154(b) by 0 days.

(21) Appl. No.: 09/530,359

(22) PCT Filed: Oct. 28, 1998

(86) PCT No.: PCT/JP99/04880

§ 371 Date: Jul. 5, 2000

§ 102(e) Date: Jul. 5, 2000

(87) PCT Pub. No.: WO99/22894

PCT Pub. Date: May 14, 1999

(30) Foreign Application Priority Data

Oct. 30, 1997 (JP) .............................................. 9-298717

(51) Int. Cl.$^7$ ................................................. B22F 1/00
(52) U.S. Cl. .................. 428/570; 427/212; 427/213.3; 427/214; 427/216; 427/217; 427/219
(58) Field of Search ........................... 75/252; 427/212, 427/213.3, 214, 216, 217, 219; 428/570

(56) References Cited

U.S. PATENT DOCUMENTS

| 4,309,457 A | * | 1/1982 | Kawasumi et al. ......... 427/214 |
| 5,021,315 A | * | 6/1991 | Goldman | |
| 5,071,676 A | * | 12/1991 | Jacobson ................... 427/214 |
| 5,650,194 A | * | 7/1997 | Yamasaki et al. ........... 427/131 |
| 5,759,230 A | * | 6/1998 | Chow et al. .................. 75/362 |
| 5,885,653 A | * | 3/1999 | Waldenstrom et al. ...... 427/217 |
| 6,042,889 A | * | 3/2000 | Ballard et al. ............... 427/305 |
| 6,048,574 A | * | 4/2000 | Atarashi et al. ............. 427/127 |
| 6,197,364 B1 | * | 3/2001 | Paunovic et al. .............. 427/98 |

FOREIGN PATENT DOCUMENTS

| JP | 59-31003 | 2/1984 | ............. H01F/1/06 |
| JP | 63-213905 | 9/1988 | ............. H01F/1/06 |
| JP | 6-299363 | 10/1994 | ........... C23C/18/31 |
| JP | 7-76702 | 3/1995 | ............. B22F/1/02 |

OTHER PUBLICATIONS

International Search Report.
Tokuzo Kobe,"Electroless Plating (in Japanese)", Japan (Tokyo); Shinshoten, Dec. 10, 1984, p. 5, lines 4 to 10.

\* cited by examiner

*Primary Examiner*—Ngoclan Mai
(74) *Attorney, Agent, or Firm*—Sughrue Mion, PLLC

(57) ABSTRACT

A highly functional film-coated powder which is produced without using the method based on the hydrolysis of a metal alkoxide and without using a metal alkoxide, which is an expensive compound, or a highly flammable organic solvent and which therefore can be obtained at a low overall product cost without necessitating explosion-proof facilities in the production equipment and while attaining easy temperature and humidity regulation; and a process for producing the same. The film-coated powder comprises a base particle having films on the surface thereof, wherein at least one of the films is formed by reaction of a metal salt in an aqueous solvent having a constant pH. By the technique, the surface of base particle can be evenly coated with a solid phase film while inhibiting particle aggregation without precipitating an independent solid phase in the liquid phase.

12 Claims, No Drawings

COATED POWDER AND PROCESS FOR THE PREPARATION THEREOF

TECHNICAL FIELD

The present invention relates to a technique for producing a powder performing a combination of functions by coating the surface of a powder particle with plural layers of other substance. More particularly, the present invention relates to a film-coated powder comprising a base particle having thereon a film formed by reaction in an aqueous solvent, and to a process for producing the same.

BACKGROUND ART

A technique comprising coating the surface of a powder with another substance to improve the properties of the powder or impart a variety of properties thereto is known. Various means therefor have been conventionally proposed.

For example, many coating techniques for forming a film on the surface of an object for the purpose of protection or decoration are known, such as spreading method, precipitation method, sputtering, vapor deposition, electrodeposition, anodization, and the like. However, in the spreading method and the precipitation method, it is difficult to form a film in an even thickness. In the sputtering and the vapor deposition, it is difficult to obtain a thick coating film. Furthermore, the electrodeposition and the anodization have a problem that these techniques are unsuitable for the treatment of a powder because the treated material should be used as an electrode.

With progress in various technical fields, a powder having unique properties, especially a metal or metal compound powder, is desired. Namely, a powder which combines properties inherent only in a powder, especially a metal or metal compound powder, with other properties so as to have a combination of functions is desired. Such powders were thought to be produced by forming plural layers of a metal oxide film etc. having an even thickness on a base particle.

As a useful method of metal oxide formation for providing a powder, especially a metal or metal compound powder, which has a combination of properties capable of meeting new requirements and can perform a combination of functions such as described above, the present inventors invented a powder comprising a base of metal or a metal compound having thereon a metal oxide film having a thickness of 0.01 to 20 μm and containing a metal component which is different from the metal constituting the base by dispersing metal powders or metal oxide powders in a metal alkoxide solution and hydrolyzing the metal alkoxide to form a coating film of a metal oxide (JP-A-6-228604).

When plural layers of the metal oxide film are formed on the powder, a special function can be imparted by regulating the thickness of each layer of the film. For example, when coating films which are different in refractive index are formed on the surface of a base in a thickness corresponding to one-fourth the wavelength of light, all the light is reflected. When this means is applied to a powder comprising a magnetic material as the base, such as a powder of a metal, e.g., iron, cobalt, nickel etc., a powder of a metal alloy, or a powder of iron nitride, then a magnetic powder for magnetic toners can be obtained which totally reflects light and has a shining white color. The reference further discloses that when a colored layer is formed on the powder and a resin layer is formed on the surface thereof, then a magnetic color toner is obtained.

The present inventors further improved the powder described above and disclosed also a powder having not one or more metal oxide films alone but two or more metal oxide films arranged alternately with two or more metal films (JP-A-7-90310). This powder has excellent properties when used as a magnetic color toner or the like.

As a method for forming a metal oxide coating film on a powder in water, a process for producing a magnetic metal powder is disclosed, which comprises adding an aqueous nickel compound solution to an alkaline suspension of a powder mainly comprising iron oxyhydroxide or iron oxide, subsequently adding an aqueous silicon compound solution, depositing the nickel compound as nickel hydroxide on the surface of the powder particles, and then neutralizing the liquid to further deposit a silicon compound on the surface of the powder particles, whereby the nickel compound and the silicon compound are successively deposited on the surface of the powder particle (JP-A-59-31003).

The present inventors directed attention to the fact that the metal oxide film formed by the hydrolysis of a metal alkoxide is extremely dense and inert and is also preferred from the standpoint of durability. Namely, even when the precipitation method is used to deposit a film on a powder particle by precipitation from an aqueous metal salt solution, the powder particle is protected under the reaction conditions for the precipitation method so long as the powder particle is coated with the metal oxide film. The present inventors thus disclosed a multilayer-coated powder characterized in that the multilayered film comprises at least one layer comprising a metal hydroxide or metal oxide film formed by the hydrolysis of a metal alkoxide and, as a layer disposed on the layer, a coating film comprising a metal hydroxide or metal oxide film formed by reaction of a metal salt in water (Japanese Patent Application No. Hei. 8-147422).

Furthermore, the present inventors found that the reflected-light interference waveform for a multilayered film can be adjusted by regulating a combination of materials for the multilayered film and regulating the film thickness. The inventors thus disclosed a pigment for color ink giving a single color, such as blue, green, yellow, and the like, and a filler for plastics or paper can be designed by coloring a powder comprising a base particle of a specific gravity of from 0.3 to 2.8 g/cm$^3$, such as an acrylic resin particle, an inorganic hollow particle, and the like, having provided thereon thin coating films which are different in refractive index (titanium dioxide film, titania film, polystyrene film, silver metal film, etc.), followed by dispersion to a fluid, even without using a dye or pigment, and that a pigment powder having a stable color tone even when stored over long is provided (WO 96/28269).

However, the method in which a metal alkoxide is hydrolyzed in order to form a coating film of a metal oxide on the surface of a metal powder or metal compound powder necessitates use of a highly flammable organic compound as a solvent and use of a metal alkoxide, which is an expensive compound, as a starting material. In order to use a highly flammable organic solvent, it is necessary to use an explosion-proof production equipment and to strictly control temperature and humidity. The overall cost of the product produced using the equipment is, of course, high.

On the other hand, the method in which a coating film is formed by the precipitation from an aqueous metal salt solution caused by reacting the metal salt has the following drawback. When a base particle made of a metal or the like is directly used in the reaction, the base is attacked by an acid or alkali and is hence dissolved due to that the solvent is in strongly acidic or alkaline conditions. As a result, a preferred film-coated powder is not obtained.

Consequently, a base particle made of a metal or the like cannot be used as it is, and a coating film inert to acids or alkalis must be first formed on the surface of the base particle, for example, by the hydrolysis of a metal alkoxide in the manner described above, or the base to be dispersed in a solvent must be limited to oxides and the like having resistance to acids, alkalis, and the like.

Accordingly, there is a problem that it is inevitably necessary to use the method based on the hydrolysis of a metal alkoxide, which is costly and highly dangerous, or to limit the material of the base particle in production.

Furthermore, in the coating film formation by the reaction of a metal salt, a solid phase ingredient may excessively precipitate depending on conditions for acid or alkali neutralization or for heating. As a result, the film deposited on the base surface is uneven in thickness, and there are cases where an independent solid phase precipitates in the liquid phase or the film-coated particles aggregate. Preferred conditions for film thickness regulation cannot be provided.

Accordingly, an object of the present invention is to overcome the drawbacks of the conventional techniques described above and to provide a highly functional film-coated powder which is produced without using the method based on the hydrolysis of a metal alkoxide and without using a metal alkoxide, which is an expensive compound, or a highly flammable organic solvent and which therefore can be obtained at a low overall product cost without necessitating explosion-proof facilities in the production equipment and while attaining easy temperature and humidity regulation; and a process for producing the film-coated powder.

DISCLOSURE OF THE INVENTION

Specifically, the constitutions of the present invention are as follows.

(1) A film-coated powder comprising a base particle having thereon films, wherein at least one of the films is formed by reaction of a metal salt in an aqueous solvent having a constant pH.

(2) The film-coated powder according to the above (1), wherein the aqueous solvent is a buffer solution.

(3) The film-coated powder according to the above (1), wherein the film formation by the reaction of a metal salt is conducted by adding a solution of the metal salt as a raw material of the film to an aqueous solvent in which the base particle has been dispersed.

(4) The film-coated powder according to the above (1), which is subjected to a heat treatment in the aqueous solvent during the film formation by the reaction of a metal salt.

(5) The film-coated powder according to the above (1), which is subjected to a heat treatment after the film formation by the reaction of a metal salt.

(6) The film-coated powder according to the above (1), wherein the film formed by the reaction of a metal salt has a thickness of from 10 nm to 10 $\mu$m.

(7) The film-coated powder according to the above (1), wherein plural films are formed by the reaction of a metal salt.

(8) A process for producing a film-coated powder in which the powder comprises a base particle having thereon films, comprising forming at least one of the films by reaction of a metal salt in an aqueous solvent having a constant pH.

(9) The process for producing a film-coated powder according to the above (8), wherein the aqueous solvent is a buffer solution.

(10) The process for producing a film-coated powder according to the above (8), wherein the film formation by the reaction of a metal salt is conducted by adding a solution of the metal salt as a raw material of the film to an aqueous solvent in which the base particle has been dispersed.

(11) The process for producing a film-coated powder according to the above (8), wherein a heat treatment is conducted in the aqueous solvent during the film formation by the reaction of a metal salt.

(12) The process for producing a film-coated powder according to the above (8), wherein a heat treatment is conducted after the film formation by the reaction of a metal salt.

(13) The process for producing a film-coated powder according to the above (8), wherein the film formed by the reaction of a metal salt has a thickness of from 10 nm to 10 $\mu$m.

(14) The process for producing a film-coated powder according to the above (8), wherein plural films are formed by the reaction of a metal salt.

According to the present invention, a solid phase film can be coated on the-surface of a base particle by using an aqueous solvent having a constant pH as a reaction solvent for film formation without precipitating only independent solid phase in the liquid phase and while inhibiting particle aggregation.

Specifically, a buffer solution is used as a reaction solvent in the film-forming reaction to deposit a film at an appropriate rate at a constant pH. As a result, the precipitation of a solid phase not serving as a coating film is inhibited and a coating film having an even thickness can be formed in a desired thickness.

Furthermore, by maintaining a constant pH, the charges on the surface of the film-coated powder are simultaneously kept constant. As a result, due to the function of an electrical double layer, the film-coated powder is free from aggregation, and dispersed particles are obtained.

In order to take advantage of the function of the electrical double layer, the pH is regulated depending on the combination of the base material and the metal compound to be formed in the liquid by film-forming reaction. It is also preferred to avoid the isoelectric points for both.

Due to the above-described action mechanism, the present invention has succeeded in easily producing a powder coated with a film having an even and desired thickness despite the use of a water-soluble starting material.

The use of water as a solvent produces an effect that film formation is possible at a lower production cost than in the alkoxide method.

In the present invention, a powder comprising an inorganic substance can be used as the base for the film-coated powder of the present invention. Examples of the inorganic substance constituting the powder according to the present invention comprising an inorganic substance include metals, such as iron, nickel, chromium, titanium, aluminum, and the like; metal alloys, such as iron-nickel alloys, iron-cobalt alloys, and the like; iron-nickel alloy nitrides; iron-nickel-cobalt alloy nitrides; metal oxides, such as oxides of iron, nickel, chromium, titanium, aluminum, silicon (in this case, silicon is classified in metals), and the like; oxides of alkaline earth metals, such as calcium, magnesium, barium, and the like; composite oxides thereof; clays; and glasses.

Since one object of the present invention is to produce a powder having magnetic properties, such as a magnetic color toner or a magnetic color ink, it is preferred in this case to use a ferromagnetic material as the base of the multilayer-coated powder of the present invention. The ferromagnetic material may be a metal having a high magnetic permeability, such as iron, nickel, chromium, titanium, aluminum, or the like. However, a ferromagnetic oxide or ferromagnetic alloy, such as ferrite or γ-iron oxide, can also be used.

Although these bases are not particularly limited in particle diameter, they are preferably ones having a particle diameter of from 0.01 μm to several millimeters.

The specific gravity of the base particle used is from 0.1 to 10.5. From the standpoints of flowability and suspendability; however, the specific gravity thereof is preferably from 0.1 to 5.5, more preferably from 0.1 to 2.8, and most preferably from 0.5 to 1.8. When the specific gravity of the base is less than 0.1, it is uneconomical in that the buoyancy of the base in a liquid is so high that a film of a larger number of layers or having an exceedingly large thickness should be formed. On the other hand, when the specific gravity thereof is more than 10.5, it is similarly uneconomical in that a film for suspending the base should be formed thickly.

In the present invention, the base powder particle is coated with plural coating layers which are different from each other in refractive index and which each has a suitably selected refractive index and a suitably selected thickness to obtain a powder which has an interference color and has a specific interference reflection peak outside the visible light region besides in the visible light region.

As described above, in depositing a metal hydroxide film or metal oxide film on the surface of a base particle by the reaction of a metal salt, a buffer solution is used as the solvent for the solid phase precipitation reaction to deposit the film at an appropriate rate at a constant pH.

Examples of the metal used as a metal salt in the present invention include iron, nickel, chromium, titanium, zinc, aluminum, cadmium, zirconium, silicon, tin, lead, lithium, indium, neodymium, bismuth, cerium, antimony, and the like, and further include calcium, magnesium, barium, and the like. Examples of a salt of these metals include salts of sulfuric acid, nitric acid, hydrochloric acid, oxalic acid, carbonic acid, and carboxylic acid. Furthermore, chelate complexes of the above metals are included A suitable kind of the metal salt for use in the present invention is selected according to the properties to be imparted to the surface of the base and to the means to be used for production.

The film of a metal oxide formed from any of these metal salts and the like may be deposited as plural layers. According to need, films of a metal oxide formed by the hydrolysis of a metal alkoxide and the like or films formed by another film-forming method may be deposited on those films of a metal oxide and the like.

A multilayered film can be formed on a base particle in the manner described above. In addition, by using such deposition conditions that each layer is deposited in a given thickness in forming the multilayered film, it is possible to obtain desired properties. Furthermore, it is possible to form a film of a metal oxide and the like as plural layers by a simple operation using a metal salt as an inexpensive starting material. In particular, an important advantage is that a multilayer-coated powder is obtained without using an expensive metal alkoxide as a starting material.

In the method for producing the film-coated powder of the present invention, a multilayered coating film may be formed through continuous steps. Alternatively, the coating layers may be formed one by one, or a technique may be used in which an operation for forming one layer is conducted in combination with an operation for continuously forming plural layers. Thus, various methods including these can be used in producing the film-coated powder.

The particle diameter of the film-coated powder according to the present invention is not particularly limited and can be suitably regulated according to purposes. In general, however, it is from 0.01 μm to several millimeters.

In the present invention, the thickness of a metal oxide film formed at a time can be regulated to from 5 nm to 10 μm. Namely, the film can be deposited more thickly than in conventional deposition methods The total thickness of metal oxide films formed through plural operations conducted separately is preferably from 10 nm to 20 μm in the case of the magnetic color powder described above from the standpoint of forming metal oxide films having a satisfactory reflectance with respect to reflection by interference therein. The more preferred range thereof is from 20 nm to 5 μm. Especially from the standpoint of forming films which have a small thickness but reflect visible light based on interference due to limitation of the particle diameter, the total film thickness is preferably from 0.02 to 2.0 μm.

The powder produced-in the manner described above which comprises a base particle having a metal oxide film or the like on the surface thereof can obtain various properties according to the material of the base particle selected and the material of the metal oxide film deposited on the surface of the base particle. Therefore, the film-coated powder can be used in applications for respective purposes. For example, when a magnetic material, such as iron metal, iron nitride, triiron tetroxide, or the like, is used as the base particle and the particle is coated with a film of silicon oxide (referred to also as "silica"), having a lower refractive index than the magnetic material, and further with a layer of titanium oxide (referred to also as "titania"), having a higher refractive index, as an outer film, then a magnetic powder having a high degree of whiteness is obtained. When a conductor, such as silver, copper, aluminum, or the like, is used as a base particle and this metal layer is coated with a film of an electrically insulating metal oxide such as an aluminum oxide, then a thermally conductive powder having an electrically insulating surface layer is obtained.

Furthermore, for example, when coatings having different refractive indexes are formed on the surface of a base each in such a thickness that the product of the refractive index of the substance constituting the film and the thickness of the film corresponds to one-fourth the wavelength of an electromagnetic wave, then most of the light is reflected due to interference (Fresnel reflection). This function can be utilized to produce a magnetic powder for magnetic toner which reflects light and has a shining white color by using, as a base, a magnetic material, such as a powder of a metal, e.g., iron, cobalt, nickel, or the like, an alloy powder, or an iron nitride powder, forming a layer of a high-reflectance metal, such as silver, cobalt, or the like, on the surface of the base, further forming on the outer side thereof a layer of an oxide having a lower refractive index than that metal, such as silicon oxide, in such a thickness that the product of the refractive index of the oxide and the thickness of this film is one-fourth a wavelength of visible light, and then coating this film with a layer of a high-refractive-index oxide, such as titanium oxide, in the thickness which is one-fourth a wavelength of visible light.

The powder produced may be subjected to a heat treatment in an inert gas atmosphere at a temperature of from 200° C. to 800° C. Thus, a tougher powder having a higher degree of whiteness is obtained. When this heat treatment of the powder is conducted, it should be performed in such a manner that the powder obtained through the heat treatment satisfies the requirement that in each layer the product of the refractive index of the material and the film thickness is one-fourth a wavelength of visible light.

A magnetic color toner is produced by further forming a colored layer on this powder and still further forming a resin layer thereon. Since visible light has wavelengths distributed in a certain width, the particle constituting the magnetic toner may have oxide layers formed alternately with metal layers so that these layers have slightly different thicknesses within a range in which the product of the refractive index of the material and the film thickness is close to one-fourth a wavelength of visible light.

In producing a multilayer-coated powder as a powder colored by interference reflection, a high-refractive-index film and a low-refractive-index film are alternately formed in respective thicknesses necessary for Fresnel interference so that light of target spectral wavelengths is reflected.

A method for forming a multilayered film composed of layers of a metal oxide having a high refractive index and, alternately arranged therewith, layers of a metal oxide having a low refractive index is explained below in detail as an example. In the case of first forming a coating film of titanium oxide, zirconium oxide, or the like, a base particle is immersed and dispersed in a buffer solution, such as an acetic acid/sodium acetate system or the like. Titanium sulfate, zirconium sulfate, or the like, which is a salt of metal, such as titanium, zirconium, or the like, is used as a starting material An aqueous solution of the metal salt is gradually added dropwise to the reaction system to yield a metal hydroxide or metal oxide and deposit the same on the base particle. During this dropwise reaction, the pH is kept at the pH of the buffer solution (3.6).

After completion of the reaction, the powder is recovered by solid/liquid separation and subjected to washing/drying, followed by a heat treatment. The drying may carried out according to either vacuum drying or natural drying. It is also possible to use an apparatus, such as a spray dryer or the like, in an inert atmosphere.

The formation of titanium oxide as a coating film in this case is shown by the following reaction formula:

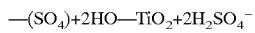

—(SO$_4$)+2HO—TiO$_2$+2H$_2$SO$_4^-$

When a coating film of silicon oxide, aluminum oxide, or the like is subsequently formed, the titania-coated particle is immersed and dispersed in a buffer solution of a KCl/H$_3$BO$_3$ system or the like to which NaOH has been added. Sodium silicate, aluminum chloride, or the like, which is a salt of metal, such as silicon, aluminum, or the like, is used as a starting material. An aqueous solution of the metal salt is gradually added dropwise to the reaction system to yield a metal hydroxide or metal oxide and deposit it on the base particle. During this dropwise reaction, the pH is kept at the pH of the buffer solution (9.0).

After completion of the reaction, the powder is recovered by solid/liquid separation and subjected to washing/drying, followed by a heat treatment. By this operation, two metal oxide films which are different in refractive index are formed on the surface of the base particle By repeating this operation, a powder having a multilayered metal oxide film on the surface thereof is obtained.

Also, the formation of silicon oxide as a coating film is shown by the following reaction formula:

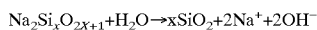

Na$_2$Si$_x$O$_{2x+1}$+H$_2$O→xSiO$_2$+2Na$^+$+2OH$^-$

The buffer solution is not particularly limited and various systems may be used. However, it is important that base particles can be sufficiently dispersed therein At the-same time, it is necessary to select a buffer solution which satisfies requirements that the film-coated powder comprising base particles and a metal hydroxide or metal oxide deposited on the surface thereof can also be dispersed in the buffer solution due to the function of an electrical double layer and that a dense coating film can be formed by the reaction with gradual dropwise addition.

Consequently, the process of the present invention for producing a film-coated powder is different from the conventional method in which a coating film is deposited by neutralization by the reaction of a metal salt solution or deposited by isoelectric point precipitation or thermal decomposition.

The buffer solution for use in the present invention varies depending on the solid phase ingredients to be precipitated, and is not particularly limited. Examples thereof include a Tris system, a boric acid system, a glycine system, a succinic acid system, a lactic acid system, an acetic acid system, a tartaric acid system, a hydrochloric acid system, and the like.

Next, starting materials, especially metal salts, for use in the present invention are explained.

Preferred starting materials for use in forming a high-refractive-index film-include halides, sulfate etc. of titanium for a titanium oxide film; halides, sulfate, carboxylates, oxalate, chelate complexes etc. of zirconium for a zirconium oxide film; halides, sulfate, carboxylates, oxalate etc. of cerium for a cerium oxide film; halides, nitrate, carboxylates etc. of bismuth for a bismuth oxide film; and halides, sulfate etc. of indium for indium oxide films.

Preferred starting materials for use in forming a low-refractive-index film include sodium silicate, water glass, silicon halides, organosilicon compounds, such as alkyl silicates and the like, polymers thereof etc. for a silicon oxide film; halides, sulfate, chelate complexes etc. for an aluminum oxide film; and sulfate, halides etc. of magnesium for a magnesium oxide film.

In the case of forming a titanium oxide film, for example, use of a mixture of titanium chloride and titanium sulfate is effective, for example, in giving a film of rutile titanium oxide, having a high refractive index, at a lower temperature.

Furthermore, the reaction for each coating is conducted while regulating the reaction temperature so as to be suitable for the kind of the metal salt, and thus a more perfect oxide film can be formed.

When the reaction for forming a coating film on the surface of a base in an aqueous solvent (solid phase precipitation reaction) is too slow, the reaction system may be heated to accelerate the solid phase precipitation reaction. However, excessive heating results in too high a reaction rate. As a result, a supersaturated solid phase precipitates in the aqueous solution without forming a film and forms a gel or fine particles. Namely, film thickness regulation becomes difficult.

After the coating film formation, the film-coated powder is repeatedly washed with decantation while adding distilled water to remove electrolytes from the coating film. Thereafter, the film-coated powder is preferably subjected to a heat treatment, such as drying/burning or the like, to remove the water contained in the solid phase and completely convert the coating film to an oxide film. By subjecting the powder obtained through film formation to a heat treatment with a rotary tubular furnace or the like, aggregation can be prevented and dispersed particles can be obtained.

In forming a hydroxide film or an oxide film and subjecting these films with a heat treatment, the heat treatment may be conducted for every coating layer. Alternatively, the heat treatment may be conducted as the final step after the desired multilayered film has been completed.

The conditions for the heat treatment vary depending on the reaction system. However, the temperature for the heat treatment is from 200 to 1,300° C., preferably from 400 to 1,100° C. When it is 200° C. or less, it is unsuitable due to that salts and water may remain. When it is more than 1,300° C., it is unsuitable due to that the film may react with the base to form another substance. The heat treatment is carried out for from 0.1 to 100 hours, preferably from 0.5 to 50 hours.

BEST MODE FOR CARRYING OUT THE INVENTION

The present invention will be explained below in more detail by reference to Examples, but the scope of the present invention should not be construed as being limited thereto.

EXAMPLE 1

Formation of Titania Film

In 250 ml of distilled water, acetic acid and sodium acetate were dissolved to give an acetic acid concentration of 0.56 mol/l and a sodium acetate concentration of 0.05 mol/l.

To this buffer solution, 1.7 g of quartz glass beads (average particle diameter: 3 μm) was added. The beads were sufficiently dispersed with ultrasonic.

Under stirring at 800 rpm, 20 ml of an aqueous $Ti(SO_4)_2$ solution having a concentration of 85 mmol/l was added dropwise to the above mixture solution at a rate of 1.6 ml/min. During this reaction with dropwise addition, the pH was kept at 3.6. After completion of the dropwise addition, the mixture was stirred for 3 hours.

The solution containing the beads was repeatedly washed with decantation while adding distilled water to remove the electrolytes. The solid was recovered by solid/liquid separation, followed by drying to obtain titania-coated quartz glass beads.

The titania-coated quartz glass beads each was an independent particle and the film thickness thereof was 53 nm.

EXAMPLE 2

Formation of Silica Film

In 250 ml of distilled water, KCl and $H_3BO_3$ were dissolved to give a KCl concentration of 0.4 mol/l and an $H_3BO_3$ concentration of 0.4 mol/l With 250 ml of this solution, 118.23 ml of a 0.4 mol/l aqueous solution of NaOH was mixed.

To the mixed solution, 25 g of a magnetite powder (average particle diameter: 5 μm) was added. The powder was sufficiently dispersed with ultrasonic.

Under stirring at 500 rpm, 60.68 ml of a 10 wt % aqueous solution of sodium silicate was added dropwise to the above mixture solution at a rate of 30 ml/hr. During this reaction with dropwise addition (film-forming reaction), the pH was kept at 9.0.

The solution containing magnetite was repeatedly washed with decantation while adding distilled water to remove the electrolytes. The solid was recovered by solid/liquid separation, followed by drying to obtain silica-coated magnetite.

The silica-coated magnetite was composed of independent particles and the film thickness thereof was 83 nm.

EXAMPLE 3

Powder Coated with Silica and Titania Films
First Layer: Formation of Silica Film In 250 ml of distilled water, KCl and $H_3BO_3$ were dissolved to give a KCl concentration of 0.4 mol/l and an $H_3BO_3$ concentration of 0.4 mol/l. With 250 ml of this solution, 118.23 ml of a 0.4 mol/l aqueous solution of NaOH was mixed.

To the mixed solution, 25 g of a magnetite powder (average particle diameter: 5 μm) was added. The powder was sufficiently dispersed with ultrasonic.

Under stirring at 500 rpm, 60.68 ml of a 10 wt % aqueous solution of sodium silicate was added dropwise to the above mixture solution at a rate of 30 ml/hr. During this reaction with dropwise addition (film-forming reaction), the pH was kept at 9.0.

The solution containing magnetite was repeatedly washed with decantation while adding distilled water to remove the electrolytes. The solid was recovered by solid/liquid separation, followed by drying. Thereafter, this powder was heat-treated with a rotary tubular furnace to obtain silica-coated magnetite. The silica-coated magnetite was composed of independent particles and the film thickness thereof was 66 nm.
Second Layer: Formation of Titania Film In 250 ml of distilled water, acetic acid and sodium acetate were dissolved to give an acetic acid concentration of 0.56 mol/l and a sodium acetate concentration of 0.05 mol/l.

To this buffer solution, 1.7 g of the silica-coated magnetite was added. The magnetite was sufficiently dispersed with ultrasonic.

Under stirring at 800 rpm, 20 ml of an aqueous $Ti(SO_4)_2$ solution having a concentration of 85 mmol/l was added dropwise to the above mixture solution at a rate of 1.6 ml/min. During this reaction with dropwise addition, the pH was kept at 3.6. After completion of the dropwise addition, the mixture was stirred for 3 hours.

The solution containing the beads was repeatedly washed with decantation while adding distilled water to remove the electrolytes. The solid was recovered by solid/liquid separation, followed by drying. Thereafter, this powder was heat-treated with a rotary tubular furnace to obtain titania/silica-coated magnetite.

The titania/silica-coated magnetite was composed of independent particles and the thickness of the titania film was 47 nm. This titania/silica-coated magnetite was a blue powder having a peak at 402 nm. The titania/silica-coated magnetite had a magnetization of 68 emu/g in a magnetic field of 10 kOe.

INDUSTRIAL APPLICABILITY

As described above, since an aqueous solvent having a constant pH is used in the present invention as a reaction solvent for film formation, the surface of a base particle can be evenly coated with a solid phase film while inhibiting particle aggregation without precipitating an independent solid phase in the liquid phase.

Specifically, a buffer solution is used as a reaction solvent in the film-forming reaction to deposit a film at an appropriate rate at a constant pH. As a result, the precipitation of a solid phase not serving as a coating film is inhibited and a coating film having an even thickness can be formed in a desired thickness.

Furthermore, by maintaining a constant pH, the charges on the surface of the film-coated powder are simultaneously kept constant. As a result, due to the function of an electrical double layer, the film-coated powder is free from aggregation and dispersed particles are obtained.

Due to the mechanisms of action described above, the present invention has succeeded in easily producing a powder coated with a film having an even and desired thickness despite the use of a water-soluble starting material.

The present invention produces an effect that a highly functional film-coated powder and a process for producing the same are provided. The film-coated powder is produced using water as a solvent without using a metal alkoxide, which is an expensive compound, or a highly flammable organic solvent. The film-coated powder therefore can be obtained at a low overall product cost without necessitating explosion-proof facilities in the production equipment and while attaining easy temperature and humidity regulation.

What is claimed is:

1. A film-coated powder comprising a base particle having thereon metal hydroxide films or metal oxide films or a combination thereof, wherein at least one of the films is formed by reaction excluding hydrolysis of a metal salt in an aqueous solvent having a constant pH, wherein said aqueous solvent is a buffer solution.

2. The film-coated powder according to claim 1, wherein the film formation by the reaction of a metal salt is conducted by adding a solution of the metal salt as a raw material of the film to an aqueous solvent in which the base particle has been dispersed.

3. The film-coated powder according to claim 1, which is subjected to a heat treatment in the aqueous solvent during the film formation by the reaction of a metal salt.

4. The film-coated powder according to claim 1, which is subjected to a heat treatment after the film formation by the reaction of a metal salt.

5. The film-coated powder according to claim 1, wherein the film formed by the reaction of a metal salt has a thickness of from 10 nm to 10 $\mu$m.

6. The film-coated powder according to claim 1, wherein plural films are formed by the reaction of a metal salt.

7. A process for producing a film-coated powder in which the powder comprises a base particle having thereon metal hydroxide films or metal oxide films or a combination thereof, comprising forming at least one of the films by reaction excluding hydrolysis of a metal salt in an aqueous solvent having a constant pH, wherein said aqueous solvent is a buffer solution.

8. The process for producing a film-coated powder according to claim 7, wherein the film formation by the reaction of a metal salt is conducted by adding a solution of the metal salt as a raw material of the film to an aqueous solvent in which the base particle has been dispersed.

9. The process for producing a film-coated powder according to claim 7, wherein a heat treatment is conducted in the aqueous solvent during the film formation by the reaction of a metal salt.

10. The process for producing a film-coated powder according to claim 7, wherein a heat treatment is conducted after the film formation by the reaction of a metal salt.

11. The process for producing a film-coated powder according to claim 7, wherein the film formed by the reaction of a metal salt has a thickness of from 10 nm to 10 $\mu$m.

12. The process for producing a film-coated powder according to claim 7, wherein plural films are formed by the reaction of a metal salt.

* * * * *

UNITED STATES PATENT AND TRADEMARK OFFICE
CERTIFICATE OF CORRECTION

PATENT NO. : 6,387,532 B1
DATED : May 14, 2002
INVENTOR(S) : Takafumi Atarashi, Akira Kishimoto and Katsuto Nakatsuka It is certified that error appears in the above-identified patent and that said Letters Patent is hereby corrected as shown below:

<u>Title page,</u>
Item [86], PCT No.: "PCT/JP99/04880" should read -- PCT/JP98/04880 --.

Signed and Sealed this

Twenty-second Day of October, 2002

*Attest:*

*Attesting Officer*

JAMES E. ROGAN
*Director of the United States Patent and Trademark Office*